United States Patent [19]
Nagel et al.

[11] 3,723,545
[45] Mar. 27, 1973

[54] PRODUCTION OF ALKYNOLS AND ALKYNEDIOLS

[75] Inventors: Otto Nagel, Hambach; Rolf Platz, Mannheim; Werner Fuchs, Ludwigshafen, all of Germany

[73] Assignee: Badische Anilin- & Soda-Fabrik Aktiengellschaft, Ludwigshafen/Rhineland, Rhineland-Pfatz, Germany

[22] Filed: Feb. 6, 1970

[21] Appl. No.: 9,211

[52] U.S. Cl. ............... 260/635 Y, 23/285, 23/288 E, 260/618 E, 260/638 Y, 261/77, 261/123
[51] Int. Cl. .................... C07c 33/04, C07c 33/06
[58] Field of Search........... 260/635 Y, 638 Y, 618 E; 23/285, 288 E; 261/77, 123

[56] References Cited

UNITED STATES PATENTS

| | | | |
|---|---|---|---|
| 2,938,924 | 5/1960 | Simon et al. | 260/631 R |
| 2,487,007 | 11/1949 | Walker et al. | 260/638 Y |
| 3,154,589 | 10/1964 | Moore | 260/635 Y |
| 2,577,856 | 12/1951 | Nelson | 23/288 E |
| 3,071,447 | 1/1963 | Pernhard | 23/285 |
| 2,386,681 | 10/1945 | Hadden | 23/285 |
| 3,363,024 | 1/1968 | Majumdar et al. | 23/284 |
| 2,599,466 | 6/1952 | Lienhart | 23/288 E |
| 3,288,875 | 11/1966 | Payne et al. | 23/285 |
| 2,151,547 | 3/1939 | Auerbach | 261/77 |

OTHER PUBLICATIONS

Reppe et al., Alien Property Custodian, S.N. 327,820, April 20, 1943.

Primary Examiner—Howard T. Mars
Assistant Examiner—Joseph E. Evans
Attorney—Johnston, Root, O'Keeffe, Keil, Thompson & Shurtleff

[57] ABSTRACT

Production of alkynols and/or alkynediols by reaction of acetylene with aldehydes in a liquid reaction medium in the presence of a heavy metal acetylide as catalyst and in the presence or absence of basic reagents, at least one of the starting materials being introduced in gaseous form. The catalyst is suspended in the liquid medium and during the reaction a portion of the reaction medium is withdrawn and returned at the entry point below the level of the liquid of the gaseous starting material(s) at a speed of 5 to 100 meters per second into the reaction medium and is introduced into a chamber (located in the reaction medium and extending in the direction of the liquid returned) whose inlet opening has a mean diameter from twice to twenty times the mean diameter of the liquid nozzle and whose length is three to thirty times ints hydraulic diameter. The products are important intermediates for example for the production of solvents or may be used in electrolytic baths.

6 Claims, 1 Drawing Figure

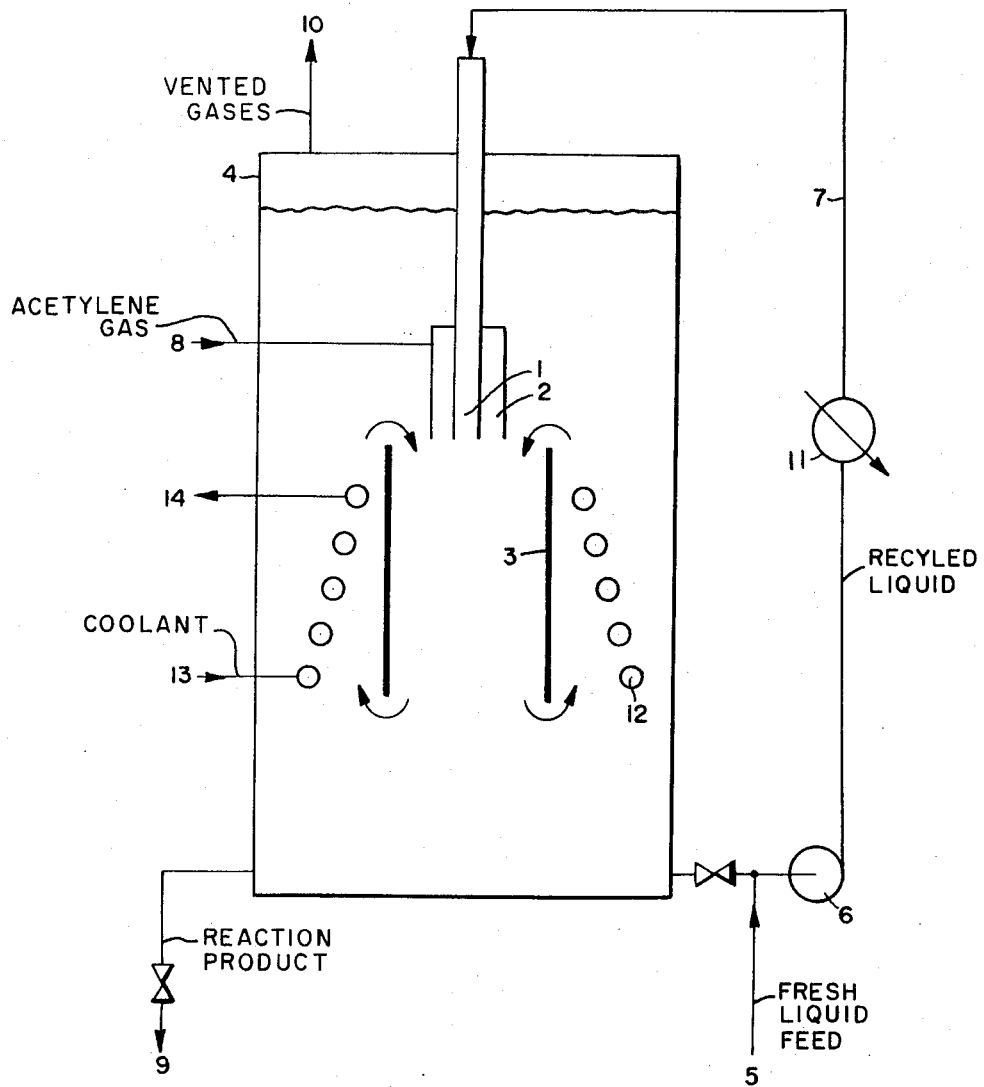

PRODUCTION OF ALKYNOLS AND ALKYNEDIOLS

The present invention relates to an improved process for the production of alkynols or alkynediols by reaction of acetylenes with aldehydes.

It is known that alkynols and alkynediols can be prepared by reaction of acetylenes with aldehydes. The reaction of acetylene with formaldehyde has evoked particularly great industrial interest. In order to control the heat of reaction of acetylene with formaldehyde, a fairly dilute formaldehyde solution is used in industrial methods and some of the heat of reaction is removed in an expensive way by a recycled gas stream. A fairly unfavorable space-time yield is thus obtained in the reaction. Another disadvantage of the prior art methods of making alkynols or alkynediols is that superatmospheric pressure is used in carrying out the reactions. The use of acetylene at superatmospheric pressure is known to require expensive safety precautions and protective measures. Other difficulties arise in the reaction of acetylenes with carbonyl compounds in the presence of copper acetylide as catalyst by the formation of cuprene. Thus the formation of cuprene in the reaction of acetylene with formaldehyde in contact with a stationary catalyst results in a drop in pressure in the reactor so that it is necessary to replace the catalyst although the activity of the catalyst has subsided only slightly (Ullmanns Enzyklopadie der technischen Chemie, 3, 109 to 119 (1953)).

An object of this invention is to provide a process for the production of alkynols and/or alkynediols by reaction of acetylenes with aldehydes in the presence of heavy metal acetylides in which local overheating and consequently damage to the catalyst are avoided.

Another object of the invention is to provide a process according to which the aldehyde can be used in more highly concentrated form.

A further object of the invention is to provide a process in which the reaction proceeds sufficiently rapidly at atmospheric pressure.

In accordance with this invention, these and other objects and advantages are achieved in a process for the production of alkynols and/or alkynediols by reaction of acetylenes with aldehydes in a liquid medium in the presence of a heavy metal acetylide as catalyst and in the presence or absence of a basic reagent, at least one of the starting materials being introduced in gaseous form into the liquid reaction medium, if a catalyst suspended in the liquid medium is used and during the reaction a portion of the reaction medium is withdrawn and returned at the entry point below the level of the liquid of the gaseous starting materials(s) at a speed of 5 to 100 meters per second into the reaction medium and is introduced into a chamber (located in the reaction medium and extending in the direction of the liquid returned) whose inlet opening has a mean diameter from twice to twenty times the mean diameter of the liquid nozzle and whose length is three to thirty times its hydraulic diameter.

The heat of reaction can be withdrawn in a very much more effective way by the process according to the invention so that the starting materials may be reacted with each other in much higher concentration than in the prior art methods. It is no longer necessary to remove heat by using a recycle gas. When copper acetylide is used as catalyst, much less cuprene is formed because local overheating at the catalyst is avoided. Moreover the reaction chamber cannot become encrusted by cuprene formation as in the prior art methods in which as a rule stationary catalysts have been used. Moreover a smaller amount of catalyst is necessary in the new process. Satisfactory space-time yields may be obtained at atmospheric pressure so that the reaction can be carried out in much simpler apparatus.

Acetylides of heavy metals of group I or II of the Periodic System are preferably used as catalysts for the process. Heavy metals are metals having a specific gravity of at least 5. The heavy metal acetylides may be used as such for the reaction. It is also possible however to use the heavy metals themselves or salts which at the beginning of the reaction are converted into the acetylides. Examples of suitable heavy metals are silver, gold, mercury and particularly copper. The type of anion is not critical in the use of heavy metal salts. Examples of suitable heavy metal salts are copper phosphate, copper acetate, copper(I) chloride, copper(II) chloride, copper acetate, copper formate, silver nitrate and mercury chloride. The heavy metal acetylides may be used as such or applied to carrier materials. Examples of suitable carrier materials are aluminum oxide, silica gel, active carbon and diatomaceous earth. The catalyst or supported catalyst is used in finely divided form.

The reaction is advantageously carried out in the presence of an inert solvent or diluent such as an alcohol, ester, amide, aromatic or aliphatic, if desired nitrated or halogenated hydrocarbon or water. Examples of solvents are ethanol, isobutanol, n-butanol, ethyl glycol, dioxane, tetrahydrofuran, chlorobenzene, nitrobenzene, trichloroethylene, dimethylformamide and N-methyl-pyrrolidone. The end product itself or excess liquid starting material may also be used as diluent.

Alkylacetylenes, preferably those having three to six carbon atoms, arylacetylenes preferably those having up to 12 carbon atoms, and alkenylacetylenes and alkynylacetylenes, preferably having four to six carbon atoms, and particularly acetylene itself may be used for the process. Examples are methylacetylene, ethylacetylene, phenylacetylene, vinylacetylene and diacetylene.

Aromatic aldehydes preferably having up to 11 carbon atoms and particularly aliphatic aldehydes may be used for the process. The aliphatic aldehydes generally have one to twelve, preferably one to six, carbon atoms. Examples of suitable aldehydes are acetaldehyde, butyraldehyde, n-caproaldehyde, benzaldehyde and preferably formaldehyde. The formaldehyde may be used in monomeric form, for example as commercial aqueous formaldehyde solution, for example as 20 to 50 percent by weight solution, or in polymerized form, for example as trioxane and particularly paraformaldehyde.

The reaction is generally carried out without adding a basic reagent. It is however also possible to carry out the process according to the invention in the presence of a basic reagent. Examples of basic reagents are salts of carbonic acid, carbonates, hydroxides of the alkaline earth metals and alkali metals. The following specific examples may be given: potassium formate, sodium acetate, sodium carbonate, potassium carbonate, magnesium carbonate and calcium hydroxide.

At least one of the starting materials in the process is introduced in gaseous form into the liquid reaction medium. Generally the starting material having the lower boiling point is supplied in gaseous form. It is also possible however to supply both the acetylene and the aldehyde in gaseous form, when both starting materials have adequately low boiling points. Starting materials supplied in gaseous form generally have a boiling point of up to 20°C.

The reactions are generally carried out at temperatures of from −10° to +120°C, particularly from −10°C to +100°C. The process is generally carried out at atmospheric pressure. It is also possible however to use superatmospheric pressure, for example of from normal pressure up to 20 atmospheres.

The starting material supplied in gaseous form may be introduced as such or diluted with an inert gas such as nitrogen, methane or ethane.

The starting materials are generally reacted in a molar ratio of about 1 : 1. It is also possible however to use one of the two starting materials in excess and then it is advantageous to keep the molar ratio of the starting materials at from 1 : 1 to 1 : 10, particularly from 1 : 1 to 1 : 3.

It is an essential feature of the new process that the recycled reaction liquid has a speed of entry of 5 to 100 m/sec, preferably of 10 to 40 m/sec. Such speeds can be achieved for example by using nozzles having for example a circular hole, a slot or an annular gap. The starting material supplied in gaseous form and the recycled reaction liquid may be introduced into the reactor from two separate openings located side by side or from two concentric openings, the direction of entry and the speed of the gas being chosen at will. The ratio of the volume of liquid withdrawn from the reactor and supplied to it to the volume of gas (STP) is generally from 2 : 1 to 0.1 : 1.

The suspended catalyst may be retained, for example by filtration, from the portion of reaction medium withdrawn and recycled, prior to withdrawal. Generally however the catalyst is allowed to circulate with the reaction liquid.

Generally the amount of reaction liquid allowed to circulate per hour during the reaction is from once to 500 times, preferably from 5 to 200 times, the amount of reaction liquid present.

The reaction liquid recycled at the said speed is introduced into a chamber situated in the reaction medium and extending in the direction of entry of the liquid supplied, which chamber has an inlet opening whose mean diameter is twice to twenty times, preferably twice to ten times, the mean diameter of the liquid nozzle and which has a length which is three to thirty times, preferably five to fifteen times, its hydraulic diameter.

The expression "liquid nozzle" means the outlet for the liquid. By "mean diameter" we mean the diameter of a circle which has the same cross-sectional area as the relevant cross-section of the nozzle or inlet opening of the chamber situated in the reaction medium. This chamber, which will hereinafter be referred to as the impulse exchange chamber, generally has a constant cross-section or a cross-section which increases in the direction of flow. The impulse exchange chamber should extend in the direction of entry of the liquid and may have various shapes, its shape advantageously corresponding to the shape of the nozzle used. Cylindrical tubes or cone segments are generally used. When the impulse exchange chamber is in the form of a cylindrical tube, its length should be from twice to thirty times its diameter. When the impulse exchange chamber does not have a circular cross-section or a cross-section which is constant throughout its length, its length should be twice to thirty times, preferably twice to ten times, the hydraulic diameter. Hydraulic diameter is defined as the diameter of a cylindrical tube which exhibits the same pressure loss as the impulse exchange chamber in question for the same throughput and the same length.

Instead of a single nozzle for the gas and liquid supplied and a single impulse exchange chamber, a group of tubes and a group of impulse exchange chambers may be used, it being advantageous to use nozzles of the same size. The volume of the impulse exchange chamber is as a rule only a small portion of that of the actual reaction chamber. The direction in which the liquid is introduced is not critical but, when a suspended catalyst which tends to settle is used, the downward direction is preferred. In this case the distance between the bottom of the reactor and the impulse exchange chamber is advantageously from half to three times the length of the latter. When very finely divided catalysts which do not tend to settle are used, the distance between the impulse exchange chamber and the bottom of the reactor may be varied within wide limits and it may be advantageous to allow the jet of liquid to enter upwardly because the flow of the gas and the ascent of the gas in the liquid are in the same direction and the circulation of liquid can thus be increased.

When only one of the starting materials is introduced as a gas, the other starting material is generally in dissolved form in the reaction liquid. It is also possible however for the liquid starting material to be reacted without adding a diluent. The whole of the starting material may be present at the beginning of the reaction or it may be added gradually to the reaction medium during the reaction. When both starting materials are present in gaseous form, the reaction may be carried out for example by premixing the gaseous starting materials and supplying them as a gas mixture to the liquid reaction medium.

The new process may be carried out batchwise or continuously.

The reaction takes place mainly in the interior of the impulse exchange chamber. Since a strong circulation of reaction liquid (which is ten to one hundred times the amount of liquid supplied through the nozzle) is induced by the jet of liquid entering the impulse exchange chamber, the heat generated is immediately dissipated in a large amount of liquid and may be withdrawn for example in cooling means situated outside the impulse exchange chamber or by circulating some of the reaction medium in a cooler arranged outside the reactor.

The drawing illustrates the process according to the invention.

For the sake of clarity, the nozzles and the impulse exchange chamber have been exaggerated in size as compared with the reactor. 1 denotes the nozzle for the recycled portion of the reaction medium, 2 denotes the nozzle and 8 the supply line for the gaseous starting material, 3 denotes the impulse exchange chamber, 4 the reactor, 5 the supply line for the liquid starting material in continuous operation or in batch operation where the starting material is supplied gradually during the reaction, 6 denotes the pump which withdraws some of the reaction medium and recycles it through line 7 (with or without cooling it in the cooler 11), 9 denotes the outlet for the reaction product, 10 denotes an outlet for inert gas and/or excess gaseous starting material, 12 denotes a cooling means, 13 the supply line for the coolant and 14 the withdrawal line for the coolant.

The following Examples illustrate the invention.

EXAMPLE 1

2 liters of 30 percent formaldehyde solution is placed in a reactor which is kept at atmospheric pressure. 32 g of copper acetylide on 135 g of carbon are added. 200 liters per hour of this suspension is withdrawn with a pump and, after having been passed through a cooler, returned through a nozzle into the reactor at a speed of 15 meters per second. Acetylene is supplied through the concentric annular gap of the nozzle at the rate at which it is used up. 90 liters (STP) of acetylene is used up in the first ten hours. The concentration of formaldehyde falls within this period to 17.1 percent. 344 g of butynediol is formed. After thirty hours, 645 g of butynediol has been formed, corresponding to a yield of 99 percent of the theory with reference to acetylene reacted. No local temperatures differences can be detected in the reactor. The formation of cuprene is not observed.

When the liquid circulation in the same reactor is switched off and the acetylene is supplied through a pipe closely above the bottom of the reactor, the catalyst being whirled up and the gas and liquid mixed with a stirrer, the absorption of acetylene declines to less than 5 liters in ten hours.

EXAMPLE 2

1 liter of dimethylformamide which contains 32 g of copper acetylide and 135 g of carbon suspended therein is saturated at 115°C with acetylene in a reactor and 63 g of paraformaldehyde is added. Acetylene is supplied to this suspension in the manner described in Example 1. Two further 63 g portions of paraformaldehyde are added and reacted with 95 liters of acetylene in the course of eight hours, corresponding to the acsorption of acetylene. A total of 189 g of paraformaldehyde is thus converted into butynediol. The yield of butynediol is 99.5 percent of the theory with reference to paraformaldehyde.

In a comparative experiment acetylene is supplied to the same reactor through a pipe closely above the bottom of the reactor and a stirrer is used to whirl up the catalyst and mix the gas and liquid. The circulating pump is not switched on. Only 63 g of paraformaldehyde can be reacted in 8 hours under otherwise identical conditions.

We claim:

1. A process for the production of acetylenically unsaturated alcohols which comprises reacting
   A. a member selected from the group consisting of acetylene, an alkylacetylene having three to six carbon atoms, an alkenylacetylene and an alkynylacetylene respectively having four to six carbon atoms, with
   B. an aldehyde selected from the group consisting of trioxane paraformaldehyde alkanals having one to twelve carbon atoms and aryl aldehydes having up to 11 carbon atoms, in a liquid reaction medium having suspended therein a Group I or II heavy metal acetylide as catalyst by introducing at least one of (A) and (B) in gaseous form via a nozzle into the liquid reaction medium in a reactor, continuously withdrawing a portion of said reaction medium from said reactor and recycling it into said reaction medium at an entry speed of 5 to 100 meters per second through a nozzle located concentric to or side by side with the first-mentioned nozzle and below the level of said liquid reaction medium in said reactor, thus providing intense mixing of the recycled liquid with the gas, and introducing the intermixed liquid and gas into a hollow cylindrical chamber immersed in said reaction medium and having its axis in the direction of flow of the liquid leaving said nozzle, said chamber having a diameter of its inlet opening from twice to twenty times the mean diameter of the liquid nozzle and a length from 3 to 30 times the diameter of said chamber.

2. A process as claimed in claim 1 wherein said aldehyde is formaldehyde, trioxane or paraformaldehyde.

3. A process as claimed in claim 1 wherein said aldehyde is benzaldehyde, paraformaldehyde, trioxane or an alkanal having 1–6 carbon atoms.

4. A process as claimed in claim 1 wherein said acetylide is an acetylide of silver, gold, mercury or copper.

5. A process as claimed in claim 1 wherein said acetylide is copper acetylide.

6. A process as claimed in claim 1, said entry speed being 10 to 40 meters per second.

* * * * *